(12) United States Patent
Van Der Veken et al.

(10) Patent No.: US 6,246,126 B1
(45) Date of Patent: Jun. 12, 2001

(54) HOODED WIND POWER ENGINE

(75) Inventors: Germaine Van Der Veken, St.-Jans-Molenbeek (BE); Pierre Martinet, St.Etienne (FR); Jozef Adriaenssens, Antwerpen (BE)

(73) Assignee: Germaine Van Der Veken, St.-Jans. Molenbeek (BE)

( * ) Notice: Subject to any disclaimer, the term of this patent is extended or adjusted under 35 U.S.C. 154(b) by 0 days.

(21) Appl. No.: 09/449,524

(22) Filed: Nov. 29, 1999

Related U.S. Application Data

(63) Continuation-in-part of application No. 09/284,830, filed as application No. PCT/BE97/00122 on Oct. 21, 1997.

(30) Foreign Application Priority Data

Oct. 22, 1996 (FR) .................................................. 96 12804
Mar. 4, 1997 (CH) .................................................. 0510/97

(51) Int. Cl.⁷ ...................................................... F03D 1/00
(52) U.S. Cl. ............................................. 290/55; 290/44
(58) Field of Search ..................... 290/44, 55; 415/2.1, 415/1, 48

(56) References Cited

U.S. PATENT DOCUMENTS

| 1,345,022 | 6/1920 | Oliver . | |
|---|---|---|---|
| 3,192,712 | 7/1965 | Nash et al. ............................. | 60/35.6 |
| 3,883,750 | 5/1975 | Uzzell, Jr. .............................. | 290/55 |
| 4,047,832 | 9/1977 | Sforza ..................................... | 415/1 |
| 4,079,264 | 3/1978 | Cohen .................................... | 290/55 |
| 4,260,325 | 4/1981 | Cymara ............................... | 415/2 R |
| 4,324,985 | * 4/1982 | Oman ..................................... | 290/55 |
| 4,396,843 | 8/1983 | Martinez Parra ....................... | 290/55 |
| 4,411,588 | 10/1983 | Currah, Jr. ............................ | 415/2 A |
| 4,808,068 | 2/1989 | Asbjornson et al. ................. | 415/157 |
| 4,859,140 | * 8/1989 | Passadore .............................. | 415/48 |
| 5,035,611 | * 7/1991 | Neubecker et al. ................. | 432/176 |
| 5,827,044 | * 10/1998 | Yazici et al. .......................... | 415/132 |

FOREIGN PATENT DOCUMENTS

| 44 28 730 | 2/1996 | (DE) . | |
|---|---|---|---|
| 195 29 096 | 3/1996 | (DE) . | |
| 2317522 | 2/1977 | (FR) . | |
| 873173 | 7/1961 | (GB) . | |
| 3323-200-A | 1/1985 | (GB) .................................... | 415/4.5 |

* cited by examiner

*Primary Examiner*—Nicholas Ponomarenko
(74) *Attorney, Agent, or Firm*—Bacon & Thomas, PLLC

(57) ABSTRACT

Wind engine device consisting of a wind power engine (2) and means (3) to increase the wind velocity in the direction of the wind power engine (2) when the wind velocities are low, whereby these means (3) contain at least a first wind guiding element (5) which narrows in a conical manner according to the direction in which the wind (W) blows towards the wind power engine (2), characterized in that this device (1) contains means (4) which make it possible to diminish the wind velocity, the wind force respectively, on the place where the wind power engine (2) is situated, which contain a second wind guiding element (9) which joins the exit (7) of the first element and which widens in a conical manner according to the direction in which the wind blows on the one hand, and adjustable means (10) to move the wind power engine (2) and the second wind guiding element (9) in relation to one another, such that the wind power engine (2) slides in further or less further in the second wind guiding element (9).

10 Claims, 3 Drawing Sheets

HOODED WIND POWER ENGINE

This Application is a continuation-in-part of Ser. No. 09/284,830 filed Jun. 17, 1999 which is a 371 of PCT/BE97/100122 Oct. 21, 1997.

The present invention concerns a wind engine device.

In particular, the invention concerns a device consisting of a wind power engine and means to increase the wind velocity towards the wind power engine when said wind velocity is low, whereby these means contain at least a first wind guiding element which narrows in a conical manner according to the direction in which the wind blows towards the wind power engine.

A wind engine device of this type is known from document U.S. Pat. No. 3,883,750. However, this document does not disclose a solution which makes it possible to provide for an optimal adjustment as a function of the wind velocities, i.e. an adjustment which makes it possible to increase the effect of the wind on the wind power engine in case of a gentle breeze and to diminish said effect in case of a strong breeze.

The invention aims a wind engine device which does not have the above-mentioned disadvantage and which is particularly efficient with low wind velocities as well as with high wind velocities.

To this end, the invention concerns a wind engine device consisting of a wind power engine and means to increase the wind velocity in the direction of the wind power engine when the wind velocities are low, whereby these means contain at least a first wind guiding element which narrows in a conical manner according to the direction in which the wind blows towards the wind power engine, characterized in that this device contains means which make it possible to diminish the wind velocity, the wind force respectively, on the place where the wind power engine is situated, which contain a second wind guiding element which joins the exit of the first element and which widens in a conical manner according to the direction in which the wind blows on the one hand, and adjustable means to move the wind power engine and the second wind guiding element in relation to one another, such that the wind power engine slides in further or less further in the second wind guiding element.

In order to better explain the characteristics of the invention, the following preferred embodiments are described as an example only without being limitative in any way, with reference to the accompanying drawings, in which.

Figure 1:
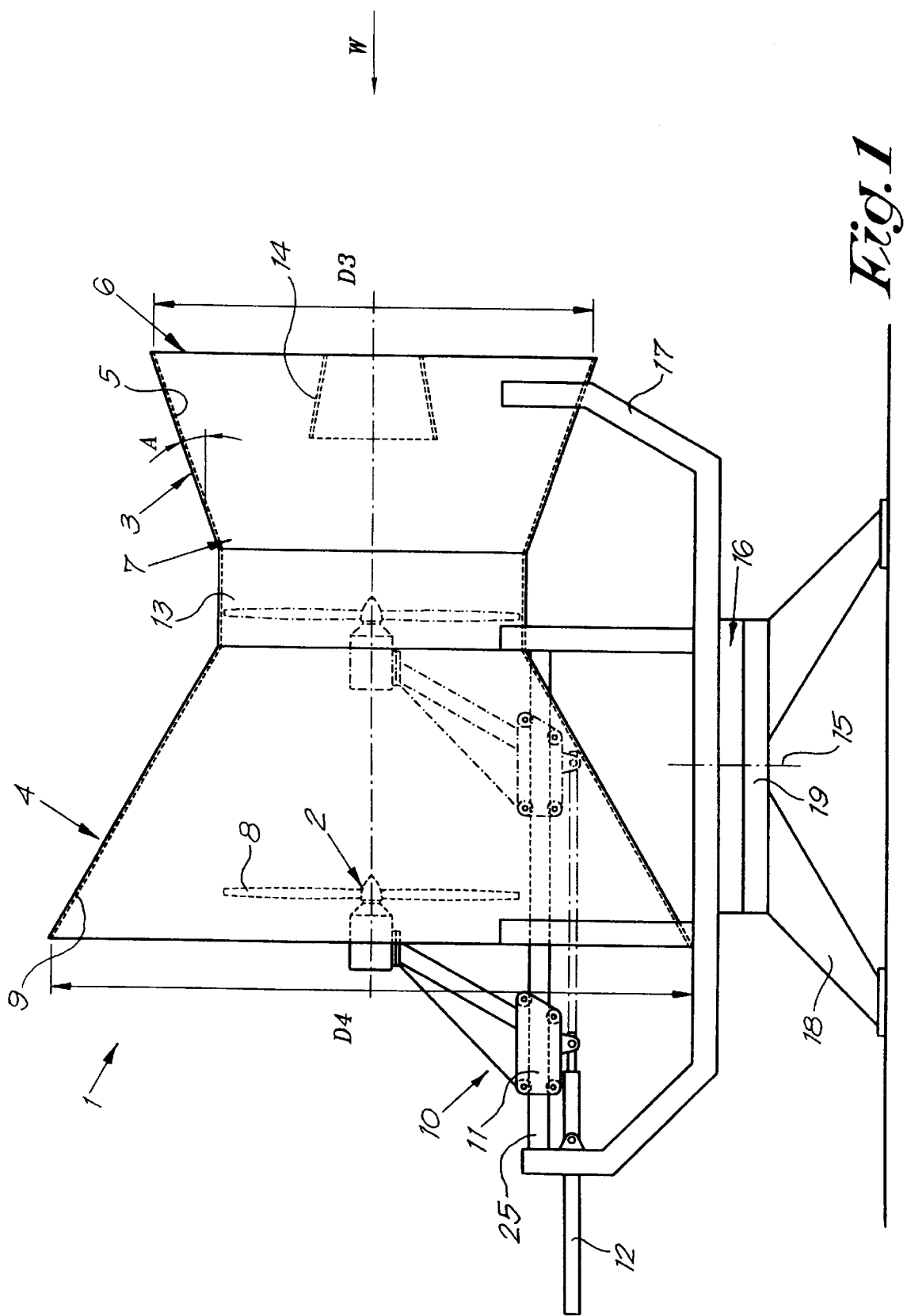
FIG. 1 represents a wind engine device according to the invention.

As represented in FIG. 1, the wind engine device 1 according to the invention mainly consists of the combination of a wind power engine 2, means 3 to increase the wind velocity in the direction of the wind power engine 2 when the wind velocities are low, and means 4 to influence, in particular diminish the wind velocity in the direction of the wind power engine 2 when the wind velocities are high.

The means 3 to increase the wind force on the place where the wind power engine 2 is situated are composed of a wind guiding element 5 which narrows in a conical manner according to the direction of the wind W.

This wind guiding element 5 mainly consists of a conical shell having a slope A which is preferably inferior to 20 degrees. The reason of this slope is that the difference in diameter at the entry 6 and at the exit 7 of this element 5, in particular the diminution of the diameter, produces an increase of the wind velocity in the direction of the rotor 8 of the wind power engine 2.

The means 4 for diminishing the wind velocity, the actual wind force respectively, on the place where the wind power engine 2 is situated, contain a second wind guiding element 9 on the one hand which joins, either directly or indirectly, the exit 7 of the first element 5 and which widens conically according to the direction in which the wind blows, and means 10 on the other hand which make it possible to move the wind power engine 2 and the second wind guiding element 9 in relation to one another, such that the wind power engine 2 slides in further or less further in the second wind guiding element 9.

In the embodiment represented in FIG. 1, the wind guiding element 9 is fixed and the above-mentioned means 10 are composed of a carriage 11 upon which the wind power engine 2 is mounted and of drive means 12 to move the carriage 11.

In the given example, these drive means 12 are composed of one or several hydraulic pressure cylinders which may be automatically controlled depending on the requirements of the wind power engine. However, it is clear that, according to a variant, the drive may be of a mechanical, electric or other nature.

Naturally, according to a variant, the wind power engine 2 can be mounted in a fixed manner, whereas the wind guiding element 9 can be moved, either with or without the wind guiding element 5.

It should be noted that the wind power engine 2 has a rotor diameter which corresponds more or less to the diameter of the passage between the first and the second wind guiding element, 5 and 9 respectively.

As represented in FIG. 1, a cylindrical connecting piece 13 can be provided.

It should be noted that the input diameter D3 is smaller than the output diameter D4.

The wind always increases inside the wind guiding element 5, with low wind velocities as well as with high wind velocities. As the diameter D4 is larger than the diameter D3 and the wind power engine 2 can be moved, the wind can be diminished as well as increased inside the wind power engine, compared to the outside wind.

As indicated in FIG. 1, the guiding element 5 may possibly be equipped with a guiding piece 14 which widens conically.

The whole can preferably rotate around a vertical shaft 15 which is equipped with drive means 16 to place it in the wind. The wind power engine 2 and the wind guiding elements 5 and 9 are mounted on a frame 17 to this end which is placed in a revolving manner on a fixed support 18–19.

The working can be easily derived from FIG. 1.

Preferably, the whole is always placed facing the wind and it is maintained in the wind by means of the driving means 16, which may be automatically controlled as a function of the data of a measuring instrument which determines the direction of the wind.

In case of a gentle breeze, the wind power engine 2 is positioned in part 13, i.e. in the right position represented in FIG. 1. The conical shape of the first wind guiding element 5 makes the wind flow increase considerably on the place where the wind power engine 2 is situated.

As soon as the wind velocity increases in the open or during a storm, the wind engine device will not be turned away from the direction of the wind and will thus remain operational. In this case, the wind power engine 2 is moved backwards, i.e. in a more leftward position in FIG. 1. This has for a result that only a portion of the wind caught by the element 5 ends up on the wind power engine, such that the wind power engine 2 is only exposed to admitted wind velocities.

The present invention is by no means restricted to the above-described embodiments as represented in the accompanying drawings; on the contrary, such a wind engine device can be made in different shapes and dimensions while still remaining within the scope of the invention.

Figure 2:
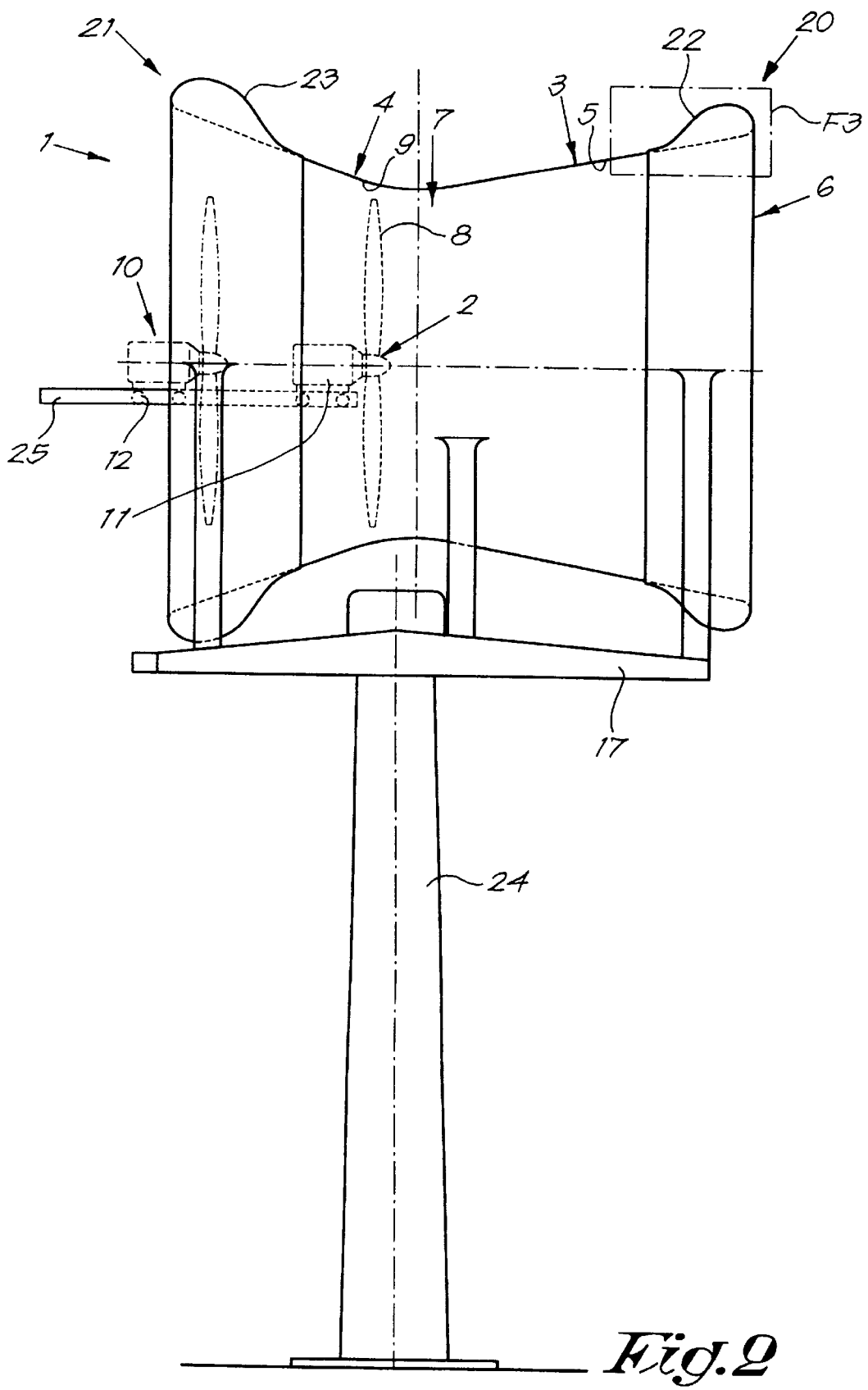
FIG. 2 represents a variant of the invention.

FIG. 2 shows a variant in which the transition between the cones of the first guiding element 5 and the second guiding element 9 has a curved shape.

The far ends 20 and 21 of said cones are provided with round wind guiding pieces 22 and 23, in particular guiding pieces having a cross section whose shape is similar to that of the wing of an airplane. It is clear that, according to a variant, only one of the far ends 20 or 21 may be equipped with such a piece 22, 23 respectively.

Figure 3:
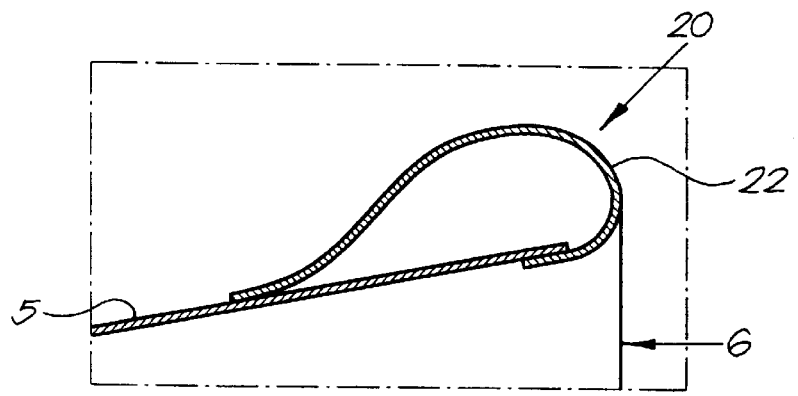
FIG. 3 shows a section of the part indicated by F3 in FIG. 2 to a larger scale.

The wind guiding pieces 22 and 23 may consist of a bent plate, fixed to the border of the far ends 20 and 21, as represented in the magnification of FIG. 3. It is clear that these pieces 22–23 can also be realized in another manner, for example they can be made as a whole with the above-mentioned cones. These pieces 22–23 also reinforce the whole.

The whole is supported by a frame 17 which is mounted in a rotatable manner to the top end of a pylon 24 of any construction whatsoever.

The wind power engine 2 can be moved by means of a carriage 11 which can move along a sliding rail 25. The sliding rail may be situated below the guiding element 9 as represented in FIG. 1, or in the middle of the guiding element 9, as represented in FIG. 2. It is clear that any other means to move the wind power engine 2 can be used to realize the invention.

Figure 4:
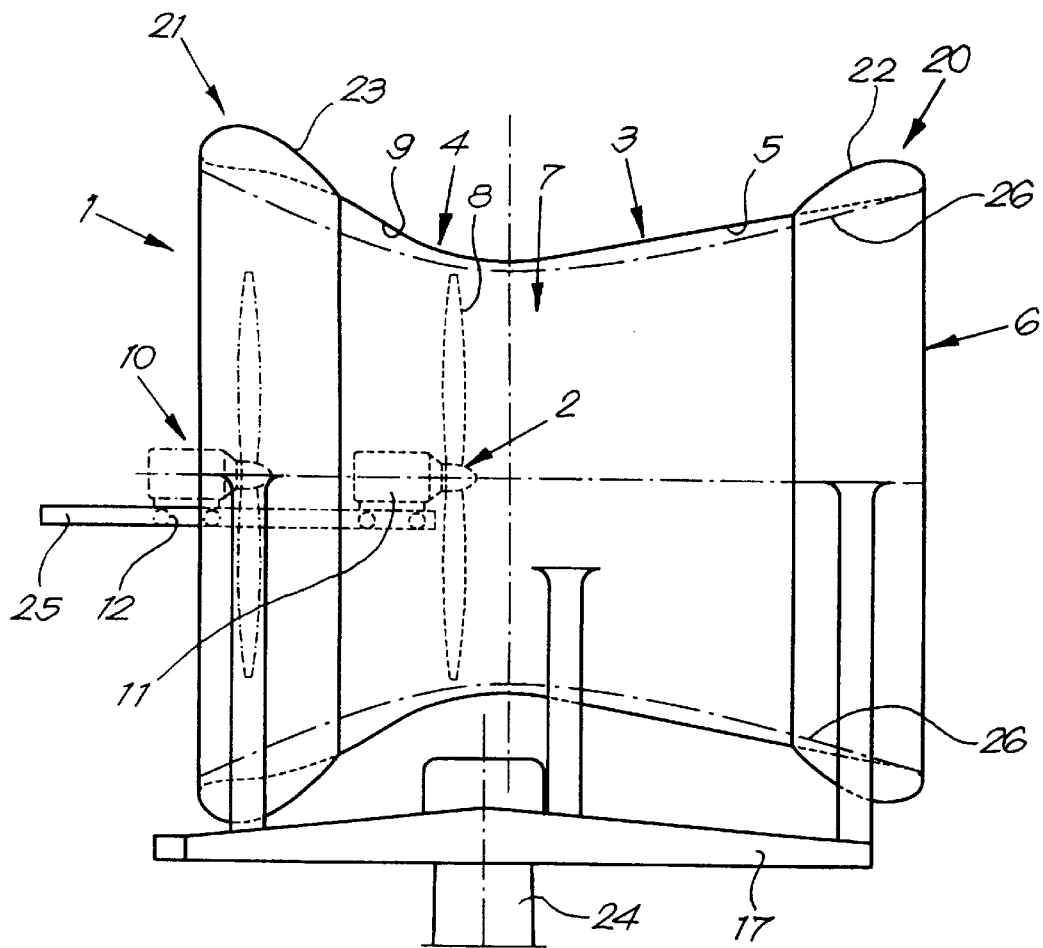
FIG. 4 represents another variant of the invention.

According to a special variant, the guiding element 9 has an inside wall which is bent in a concave manner, as represented in FIG. 4. A similar shape can be provided at the entry, i.e. for the inner wall of the first guiding element 5.

According to another variant, the inner wall may have a shape as indicated by line 26 in FIG. 4.

What is claimed is:

1. Wind engine device consisting of a wind power engine (2) and means (3) to increase the wind velocity in the direction of the wind power engine (2) when the wind velocities are low, whereby these means (3) contain at least a first wind guiding element (5) which narrows in a conical manner according to the direction in which the wind (W) blows towards the wind power engine (2), characterized in that this device (1) contains means (4) which make it possible to diminish the wind velocity, the wind force respectively, on the place where the wind power engine (2) is situated, which contain a second wind guiding element (9) which joins the exit (7) of the first element and which widens in a conical manner according to the direction in which the wind blows on the one hand, and adjustable means (10) to move the wind power engine (2) and the second wind guiding element (9) in relation to one another, such that the wind power engine (2) slides in further or less further in the second wind guiding element (9).

2. Wind engine device according to claim 1, characterized in that the two wind guiding elements (5–9) are mounted in a fixed manner and in that the wind power engine (2) can be axially moved in relation to these wind guiding elements (5–9).

3. Wind engine device according to claim 2, characterized in that the means (10) to move the wind power engine (2) are composed of a carriage (11) upon which the wind power engine (2) is mounted and of drive means (12) to move the carriage (11).

4. Wind engine device according to claim 1, characterized in that the wind power engine (2) has a rotor (8) diameter which corresponds more or less to the diameter of the passage between the first and the second wind guiding element (5–9).

5. Wind engine device according to claim 4, characterized in that the transition between the first guiding element (5) and the second guiding element (9) contains a cylindrical connecting piece (13).

6. Wind engine device according to claim 1, characterized in that the input diameter (D3) is smaller than the output diameter (D4).

7. Wind engine device according to claim 1, characterized in that the whole can rotate around a vertical shaft (15) and is provided with drive means (16) to place and maintain it in the wind.

8. Wind engine device according to claim 1, characterized in that at least one of the two wind guiding elements (5–9) is provided with an inner wall which is bent in a concave manner and/or is equipped with a round wind guiding piece (22–23) at its free end (20–21).

9. Wind engine device according to claim 8, characterized in that at least the far end (20) of the first guiding element (5) is equipped with such a wind guiding piece (22).

10. Wind engine device according to claim 9, characterized in that at least the inner wall of the second wind guiding element (9) has a bent shape.

* * * * *